Oct. 12, 1943.           B. C. REDHEAD            2,331,421
                         HOSE NOZZLE HOLDER
                        Filed March 24, 1941
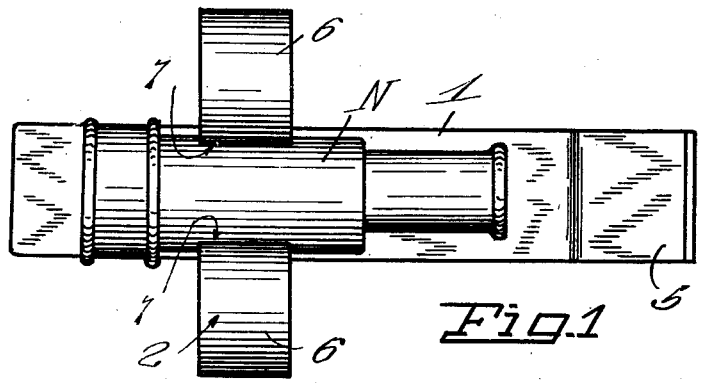
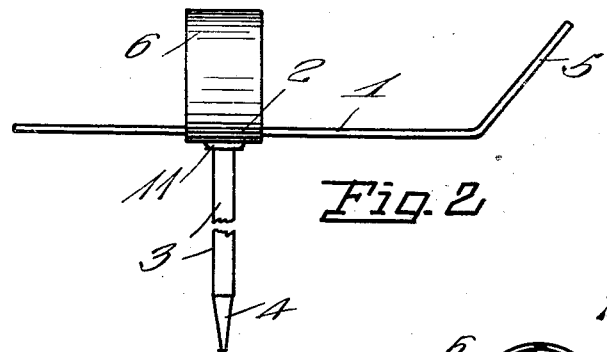
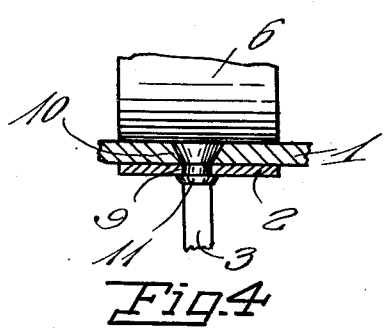
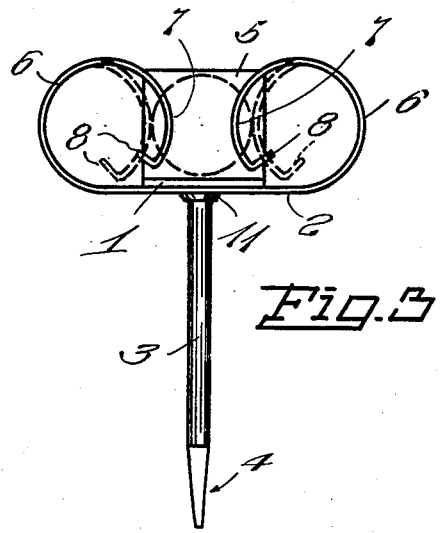
Inventor
Bert C. Redhead
By
Glenn L. Fish
Attorney Patented Oct. 12, 1943

2,331,421

UNITED STATES PATENT OFFICE 2,331,421

HOSE NOZZLE HOLDER

Bert C. Redhead, Spokane, Wash.

Application March 24, 1941, Serial No. 384,966

1 Claim. (Cl. 299—121)

This invention relates to a hose nozzle holder and one object of the invention is to provide a device of this character including a nozzle holding portion and a spike adapted to be driven into the ground and support the nozzle at a desired angle for watering a garden bed or a portion of a lawn.

Another object of the invention is to provide a nozzle holding portion including an improved clamp for securing the nozzle on a supporting strip and allowing the nozzle to be shifted to a position in predetermined spaced relation to an abutment tongue or lip against which water strikes and is converted into spray when the hose is in use.

Another object of the invention is to provide the clamp with nozzle engaging jaws so formed that the nozzle may be easily inserted between the jaws or withdrawn therefrom, but, at the same time, tightly gripped when in place between the jaws.

Another object of the invention is to provide a hose nozzle holder formed of sheet metal and which is simple in construction and may be cheaply manufactured.

In the accompanying drawing:

Fig. 1 is a top plan view of the improved hose nozzle holder with a hose nozzle mounted between the jaws of its clamp.

Fig. 2 is a side elevation of the hose nozzle holder.

Fig. 3 is a view looking at the rear end of the nozzle holder.

Fig. 4 is a fragmentary sectional view showing the manner in which the strip and the clamp are mounted at the upper end of the ground-penetrating spike.

This improved hose nozzle holder consists briefly of a strip 1 upon which the hose nozzle N rests, a clamp 2 for securing the nozzle in place on the supporting strip 1, and a spike 3 which may be of any length desired and has a pointed lower end 4 so that it may be easily forced into the ground and mount the device in a desired position and at a desired angle. The strip is formed of stiff sheet metal of suitable width and thickness and may be of any length desired, according to the size of nozzle to be applied to the holder. The forward end portion of the strip is bent upwardly to form a lip or tongue 5 which is disposed at a forward incline, as shown in Fig. 2, so that when water is discharged from the nozzle and strikes this tongue, it will be deflected and formed into a spray.

The clamp 2 extends transversely of the supporting strip and is formed from a strip of resilient metal. This strip has its end portions coiled upwardly and inwardly to form circular jaws 6 which have their inner ends open to provide nozzle engaging portions 7 terminating in inwardly bent lips 8, in order to permit these nozzle engaging portions of the jaws to move transversely of the strip 1 and not be liable to catch and hang against side edges of the strip 1 as they move toward gripping position after the nozzle has been forced into place between them.

The spike 3 serves to secure the clamp 2 and the strip 1 in engagement with each other as well as a ground-penetrating supporting member and referring to Fig. 4 of the drawing, it will be seen that the clamp and strip are formed with registering openings 9 and 10 through which the upper portion of the spike passes. The clamp rests on a collar 11 which surrounds the spike and the opening 10 is tapered downwardly so that after the spike has been passed through the openings its upper end may be formed into a rivet head 12 and securely hold the strip and clamp in place. Since the opening 10 tapers downwardly and the head 10 conforms to the shape thereof, the spike may not slip out of the openings after the head has been formed and a clinching action will take place to tightly hold the strip and clamp against turning about the spike out of proper relation to each other. The spike may be embedded in the ground vertically or at an angle or incline and the nozzle may be shifted longitudinally along the supporting strip to dispose its front end in desired spaced relation to the lip or tongue 5, and when so adjusted, it will be held firmly in a set position by the gripping action of the jaws 6. Upward pull exerted on the nozzle will, of course, detach it from the holder.

Having thus described the invention, what is claimed is:

A holder for a hose nozzle comprising a supporting strip of a length adapting it to have a hose nozzle rest longitudinally thereon with its forward portion projecting from the nozzle and having its front end bent to form an upstanding forwardly inclined deflecting portion for forming a spray of a stream of water discharged from the nozzle, a clamp extending transversely of the nozzle supporting strip in crossed relation thereto against its under face and having jaws for gripping a nozzle from opposite sides, the crossed portions of the clamp and nozzle supporting strip being formed with registering openings, the upper one of said openings being tapered downwardly, and a supporting spike having its upper portion passing through the registering openings and provided with an annular collar bearing against the under face of the clamp, the upper end of the spike being upset and forming a riveting head filling the tapered opening and cooperating with the collar to firmly hold the clamp and nozzle supporting strip in engagement with each other.

BERT C. REDHEAD.